United States Patent [19]

Norton et al.

[11] 4,275,480
[45] Jun. 30, 1981

[54] ELECTRONIC INJECTION METERING AND MONITORING SYSTEM

[75] Inventors: William W. Norton, Lincolnshire; Jack L. Stansbeary, Elk Grove Village; Johann Clemens, Palatine; Roscoe T. Earl, Lincolnshire, all of Ill.

[73] Assignee: Baxter Travenol Laboratories, Inc., Deerfield, Ill.

[21] Appl. No.: 13,513

[22] Filed: Feb. 21, 1979

[51] Int. Cl.³ ................................................ A22C 9/00
[52] U.S. Cl. ............................................ 17/25; 99/533
[58] Field of Search ..................... 17/1 R, 25, 42.1; 99/532, 533

[56] References Cited

U.S. PATENT DOCUMENTS

| | | | |
|---|---|---|---|
| 3,636,857 | 1/1972 | Panek | 99/532 |
| 3,916,777 | 11/1975 | Earl | 99/533 |
| 3,965,536 | 6/1976 | Osiadacz et al. | 17/25 |
| 4,142,000 | 2/1979 | Townsend | 99/533 X |

Primary Examiner—Willie G. Abercrombie
Attorney, Agent, or Firm—Paul C. Flattery; John A. Caruso; Q. Todd Dickinson

[57] ABSTRACT

A system is provided for injecting slaughtered animal carcasses with tenderizing solution. The carcasses to be injected are weighed and are conveyed to a plurality of sequential injection stations. A number of injection headers are energized for calculated energization time periods. Each carcass is injected by each injection header with solution that flows automatically for a calculated time period that is directly proportional to the carcass weight. A microprocessor is utilized to provide a separate data storage location for each injection station. Data is provided to each storage location in proper sequence as the side to be injected is conveyed to sequential injection stations. A separate timing means is provided for each injection station, and data from the storage location is transferred to the timing means in sequence as the carcass to be injected is conveyed to sequential injection stations. The microprocessor is also utilized to generate a display that is used to monitor the output and internal performance of the injection system with regard to weight data sequential transfer and also injection count number information. An alarm status condition is generated if the system performance is not in compliance with internal standards.

5 Claims, 5 Drawing Figures

ELECTRONIC INJECTION METERING AND MONITORING SYSTEM

BACKGROUND OF THE INVENTION

Prior art beef tenderizing techniques include the injection of an enzyme solution into the beef immediately after slaughter while the carcass is still warm. The quantity of the enzyme solution injection must be equal to a selected percentage of the weight of the meat unit. If too much enzyme solution is used, the meat may have excess moisture or may be too tender. On the other hand, if too little solution is used, the tenderization may be ineffective. Further, Federal regulations prohibit injection of more enzyme solution than a specified percent of the carcass weight.

In prior art meat tenderizing systems of the enzyme injection type, the two sides of beef forming the carcass are typically conveyed past a number of injection stations. At each injection station, there is positioned one or more operators who injects the carcass with enzyme solution. Each operator has manual control over a header carrying a number of injection needles and also coupled to a source of enzyme solution.

In order to meter the amount of enzyme solution which is injected into each side, prior art systems generally rely on volumetric metering of a charge to be injected. As a disadvantage of this prior art system, however, it has been found that it cannot be used readily in a continuous operation mode, with the individual operators of the injection needles opening at random times the valves controlling the needles to inject a desired amount of tenderizing solution, without encountering very substantial pressure variances in the system. These variances can range up to about 50 percent of the total pressure.

Because of this, when all the needles are inserted, the entire system is energized to open the valves controlling all needle headers so that all needles are opened to allow for the specific amount of fluid to be delivered into the carcass so that the system operates under similar pressure conditions for each injection procedure.

The pressure of the system is of course critical, being an important factor, along with the volume of flow dependent upon the valves communicating with the open injection needles, for determining the amount of tenderizing solution which is actually injected into the carcass at each injection site.

The above prior art tenderizing solution injection apparatus is therefore not suitable for use on a continuous moving process line, as would be most desirable for large scale operations for tenderizing carcasses of beef or the like, since all of the needles must be inserted and simultaneously opened, in order to obtain uniform pressure conditions from carcass to carcass.

The liquid delivery system of this invention overcomes the above deficiencies, and is capable of use on a moving line of carcasses in which the individual operators of injection needles do not have to depend on the other operators with respect to controlling their injection output.

It has been discovered that an effective system for injecting carcasses with tenderizing solution may be provided in which an array of needle bars would be connected to a costant flow-rate supply through hoses with injection volume, which is required to be a function of carcass weight, being varied by a timing means. Thus, energization time periods would be provided for the injection headers with the time periods being generally proportional to the carcass weight and with each side being injected by each injection header with solution that flows automatically for a calculated time period.

It is, therefore, an object of the present invention to provide a system for injecting carcasses with tenderizing solution, in which injection headers are energized for calculated energization time periods to enable enzyme solution to flow automatically for the calculated time period.

Another object of the present invention is to provide a timing system which is adaptable to microprocessor technology, and permits the efficient operation of a system for injecting cacasses with tenderizing solution.

Other objects and advantages of the present invention will become apparent as the description proceeds.

SUMMARY OF THE INVENTION

In accordance with the present invention, a system is provided for injecting slaughtered carcasses with tenderizing solution. The system is of the type in which the carcasses to be injected are weighed and are conveyed to a plurality of sequential injection stations.

The improvement comprises providing at least one injection header located at each injection station, with means for feeding injection solution to each header. Means are provided for providing energization time periods that are directly proportional to the carcass weight. Means are also provided for energizing the injection headers for the duration of the calculated energization time periods. In this manner, each carcass is injected by each injection header with solution that flows automatically for a calculated time period that is directly proportional to the carcass weight.

In the illustrative embodiment, separate timing means are provided for each injection station needle header. Means are provided for transmitting data to each timing means in sequence as the carcass to be injected is conveyed to sequential injection stations. In the illustrative embodiment, each of the timing means comprises a down counter. A master oscillator, common to all down counters, is provided for counting down the down counters to provide the calculated energization time periods.

In the illustrative embodiment, a separate data storage location is provided for each injection station. Means are provided for transmitting data to each storage location in sequence as the carcass corresponding to the weight data is conveyed to sequential injection stations.

As used herein, the term "carcass" refers to entire carcasses (e.g., both sides of beef, full lamb or chicken) or to portions thereof (e.g. side of beef).

A more detailed explanation of the invention is provided in the following description and claims, and is illustrated in the accompanying drawings.

DETAILED DESCRIPTION OF THE ILLUSTRATIVE EMBODIMENT

Figure 1:
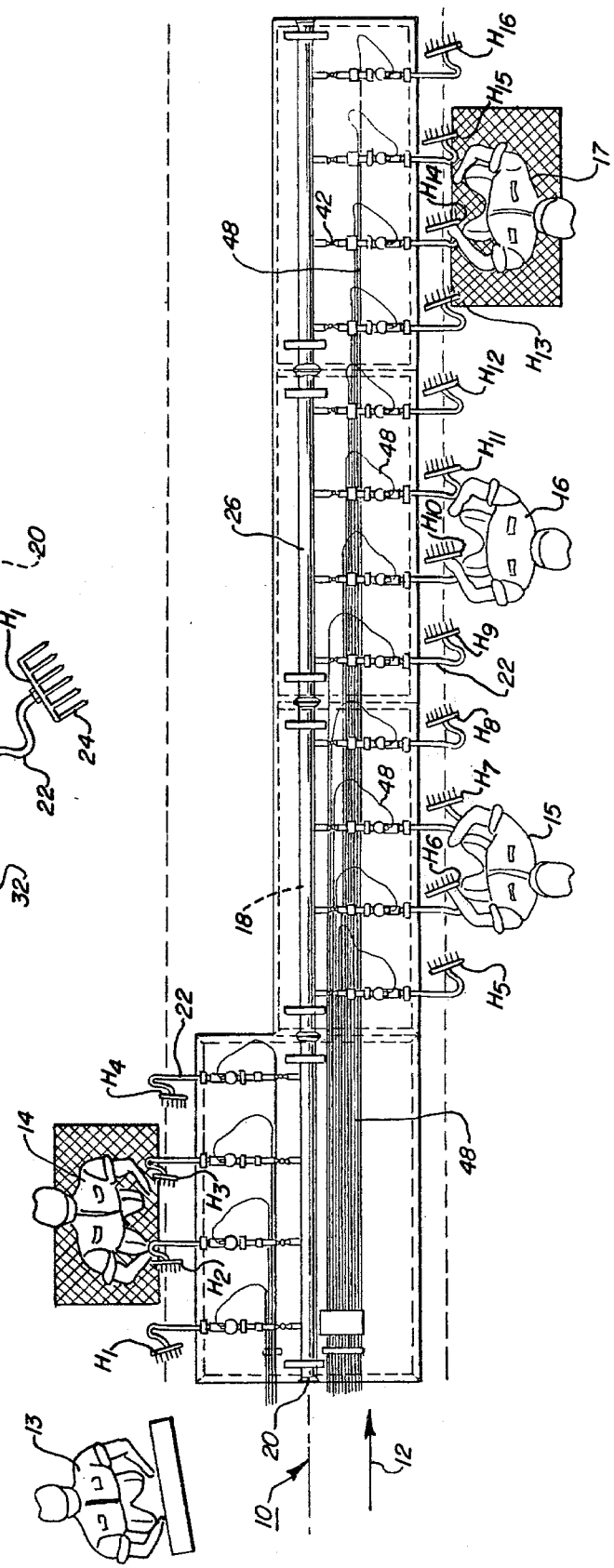
FIG. 1 is a plan view of a conveyor line for meat tenderization, using the apparatus of this invention.

Referring to the drawings, FIG. 1 shows a conveyor line 10 for animal carcasses, which may be suspended downwardly from a movable conveyor hook system of conventional design (not shown) to pass from left to right in the direction of arrow 12 along the conveyor line 10 of this invention.

A series of operators 13 through 17 are stationed at various positions along the conveyor line. Operator 13 is stationed at the control console shown in FIG. 4 to operate the overall system, and also to program into the system the respective weights of the various carcasses as they pass along conveyor line 10. Alternatively, automatic readout means from a scale that weighs the carcasses, which is positioned upstream of the conveyor line 10, may provide a direct digital transfer of information to the microporcessor control system of this invention, so that it becomes unnecessary for operator 13 to punch in the weight of each individual carcass.

As a further alternative, mechanical means may also replace operators 14–17.

Figure 2:
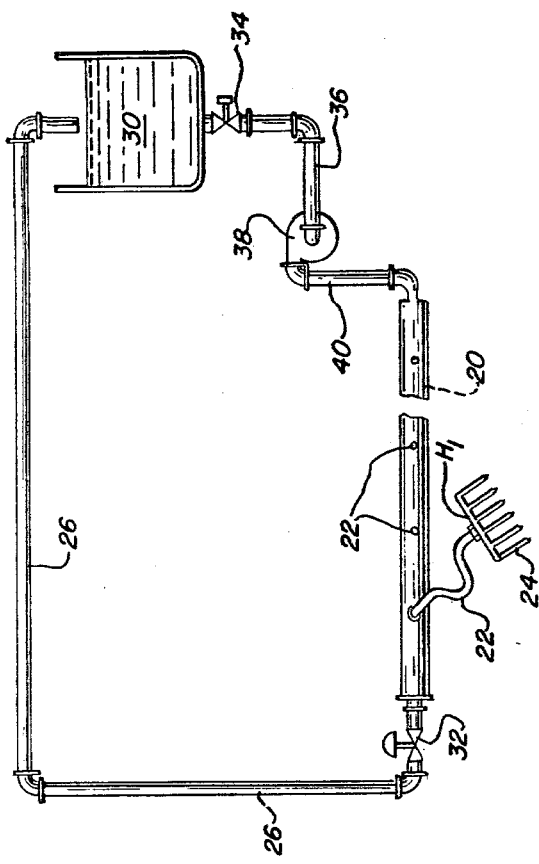
FIG. 2 is a schematic view of the apparatus of this invention, showing the overall flow path of the system.
Figure 3:
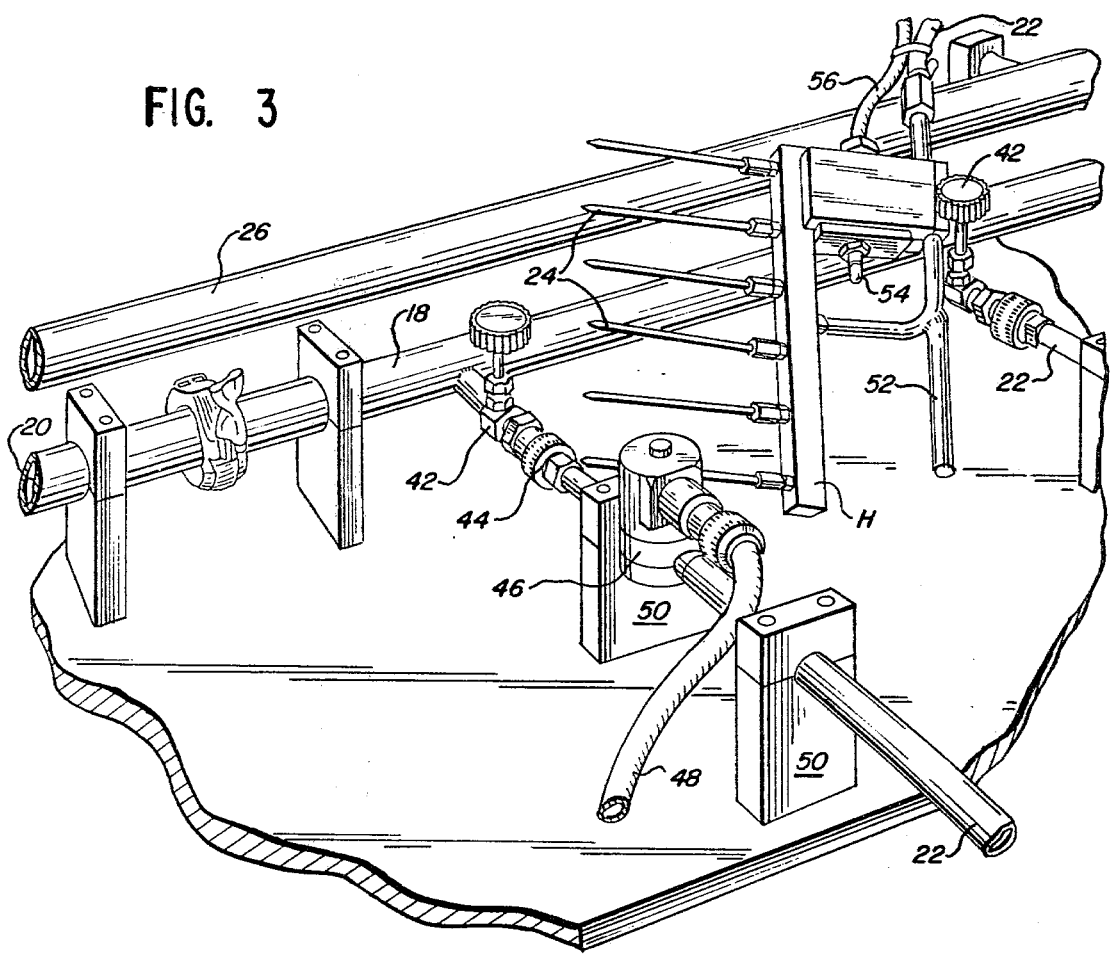
FIG. 3 is a detailed perspective view of a portion of the system of this invention.

As specifically shown in FIGS. 1 through 3, a cylindrical member 18 is provided to form the relatively large manifold chamber 20. Valved conduits 22 are provided, each of which terminate with an injection header H (the specific headers being numbered H-1 through H-16). Each header H, in turn, carries a plurality of hollow injection needles 24 which communicate through their respective header H with an associated valved conduit 22. Specifically, each header H is shown in this embodiment to carry six injection needles 24, which serve to provide an "injection" after the needles are inserted into the carcass.

Referring to the overall schematic view of the flow system as shown in FIG. 2, manifold chamber 20 communicates with an optional return conduit 26, which is specifically shown to run generally parallel with cylinder 18 through much of its length, for recirculating liquid for administration back to the liquid source which, in this specific embodiment, is a storage tank 30. Adjustable valve 32 may be adjusted from time to time as desired to control the pressure in manifold chamber 20, although generally the setting of valve 32 remains unchanged during operation.

To complete the circuit, liquid for injection flows out of storage tank 30 through a control valve 34 and conduit 36 to a centrifugal pump 38, and from there through an additional length of conduit 40 to manifold chamber 20.

As previously stated, the centrifugal pump is preferably selected to be of a capacity sufficient to create and maintain a generally constant liquid pressure in the manifold chamber 20, irrespective of whether none or all of the valved conduits 22 are open to permit liquid flow therethrough. Specifically, this may be accomplished in the apparatus shown herein with the use of a Cherry-Burrell model OH flex flow centrifugal pump with a 3½ inch diameter impeller. This particular pump has been found to provide a pressure flow relationship which results in the system disclosed in only about a two percent difference in the system pressure in manifold chamber 20 between the condition when all of valved conduits 22 are open and permitting injection flow of solution into an animal carcass, and the condition when none of the valved conduits 22 are open, with the only flow is passing through return conduit 26.

It is not necessary for tank 30 to be placed above manifold chamber 20, since pump 38 controls the pressures. Thus, the various parts of the system can be in any spatial arrangement. Also, conduit 40 can communicate with the middle of manifold chamber 20, if desired, especially when no return line is used.

Each valved conduit 22 is equipped, as shown in FIG. 3, with an adjustable valve 42 so that the respective flow through the various valved conduits 22 can be controlled as desired prior to operation of the apparatus of this invention. This valve is also used to generate a high fluid flow impediment which is necessary to obtain a constant flow-rate, in combination with a constant pressure manifold, through the needle headers while the needles are inserted into beef sides. Generally, during the meat tenderizing operation, this valve is not adjusted unless evidence of an improper rate of flow or the like is noted.

Removable connector 44 of the "Hanson Connector" type is provided to permit removal of a specific valved conduit 22 and header H for replacement with another one, if necessary. Connector 44 is conventionally adapted to permit the termination of flow from manifold chamber 20 upon disconnection, and for reopening the flow upon reconnection of another conduit 22.

Solenoid valve 46 is an on-off type valve for controlling flow through conduit 22. Valve 46 may be electrically controlled through insulated cable 48 as shown in FIG. 1. Each of the sixteen valved conduits 22 are equipped with a solenoid valve 46 which, in turn, is in communication with an electrical line 48. Line 48 communicates with the microprocessor system which governs the timing interval of each solenoid valve 46. Solenoid valve 46 may be potted in silicone rubber or the like to protect it from water damage.

Accordingly, when solenoid valve 46 is opened, liquid passes through to its respective header H and from there through needles 24 for injection into the carcass. The timed duration of the valve opening, coupled with a generally constant pressure in manifold 20 and the individual valve conduit flow restrictors, results in the reliable administration of a specific amount of solution into the desired location of the carcass, which amount is regulated by the valve timing function of the microprocessor system.

As shown in detail in FIG. 3, conduit 22 then passes through braces 50, and then communicates at its other end with header H.

Header H carries handle 52, and is equipped with a manual toggle switch 54, which is connected to electric line 56. Line 56 also communicates with the microprocessor system. When the operator has inserted needles 24 into the carcass and is ready to administer the dosage of tenderizing solution, he moves switch 54 to activate a signal through line 56. This constitutes an "injection", which through the microprocessor system, activates the timing mechanism that causes solenoid valve 46 to be opened for a predetermined length of time in a manner described above.

Operators 14 through 17 are each provided in this specific embodiment with four headers H although other arrangements are also contemplated to be within the scope of this invention. For example, operator 14 handles headers H1 through H4. Each of the operators through injection header H1 to the side that is being injected in the first injection station.

It can be seen that each side of the carcass will be tracked, as it moves along from one injection station to the next, with the corresponding weight data as it is shifted to a storage location corresponding to the injection station to which the side has processed.

Figure 4:
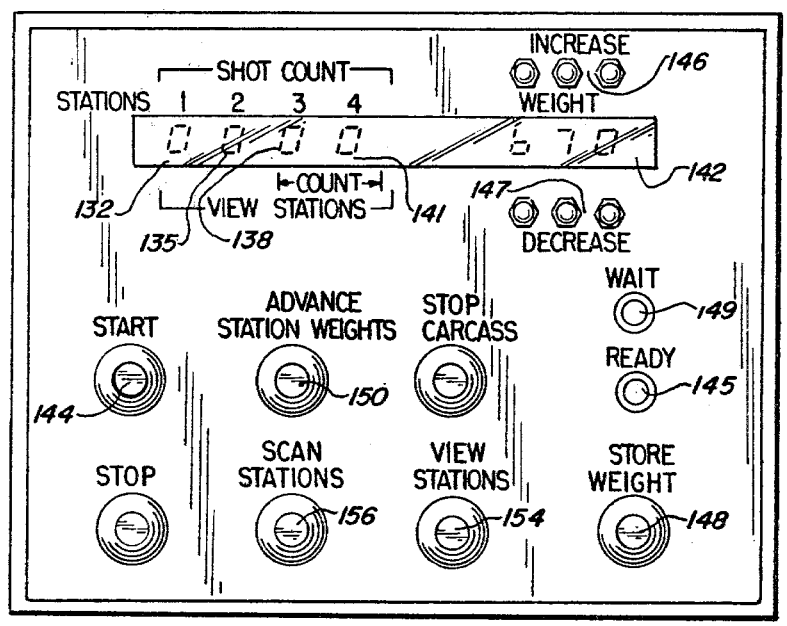
FIG. 4 is an elevational view of a control panel for operating the sytem of this invention.

An example of the operation of the injecting, tracking and monitoring system is as follows, with particular reference to FIGS. 4 and 5.

The operator first energizes the console and the electronics by turning on the power. The injection count display which contains digital displays in the form of LED's 132, 135, 138 and 141 will be set to 0 and the weight display 142 will show a base calibration weight, such as 570 pounds. This is an arbitrary reference weight and the actual weight of the carcass will be entered subsequently.

The start button 144 is then pressed by the operator. This will activate the computer functions and the ready light 145 will be energized. If a manual operation is utilized, the carcass weight is then read by the operator from a tag generally fastened to the carcass. The tag weight of the carcass that is outside of the first injection station is then entered by pushing either increase buttons 146 or decrease buttons 147, depending on whether the tag weight is less than or greater than the previous weight shown in display 142. The operator will then check to determine that the displayed weight at display 142 corresponds to the tag weight and when such condition occurs, the operator will press store weight button 148. Ready lamp 145 will now be off and wait indicator 149 will be on. When this occurs, the tag weight has entered into storage location A and storage location B.

The operator will then press advance button 150 which will shift the weight data in the storage locations and reset all shot count displays to zero. The entry in storage location 107 will be removed to weight exit storage location 152, the data in storage location 106 will be shifted to storage location 107, the weight data in storage location 105 will be shifted to storage location 106, the weight data in storage location 104 will be shifted to storage location 105, the weight data in storage location B will be shifted to storage location 104 and the weight data in storage location A will be shifted to storage location B. Summarizing, all of the weight data in the storage locations have been shifted to the right with respect to the FIG. 5 diagram.

The console operator then waits for the appropriate injection to take place. Assuming that each of the four injection stations has a side therein, each of the station operators should provide four injections at each station. As each of the injection headers are triggered by the operator, the associated timer will be programmed from contents in the associated station weight location, and the timer will energize the headers for the computed time by counting down the respective timer's down counter at a rate determined by the master oscillator as described above. Thus if weight data for a 600 pound carcass was stored in storage location 104, the operator at the first station would inject the side with injection headers H1-H4. When injection header H1 was injected into the side and the trigger pulled, display 132 would read "1". After header H2 was injected into the side and the trigger pulled, the display 132 would read "2". After all four headers have been injected into the side and the triggers pulled so that the respective injections had taken place, the display 132 would read "4". Likewise, the number of injections triggered at the second injection station would be read from display 135, the number of injections triggered at the third injection station would be read at display 138 and the number of injections triggered at the fourth injection station would be read at display 141.

Of course, different weights would be stored in the various storage locations 104-107. For example, storage location 107 could contain the weight data of the first side of a first carcass, storage location 106 could contain weight data for the second side of the first carcass, storage location 105 could contain weight data for the first side of a second carcass, storage location 104 could contain weight data for the second side of the second carcass, storage location B could contain weight data for the first side of a third carcass and storage location A could contain weight data for the second side of a third carcass. As the sides are conveyed sequentially from one injection station to the next, the operator at the console will press the advance button 150 to shift the weight data and to reset the injection count displays. It is to be understood that a rail switch could be utilized to automate this computer function and would take the place of an operator pressing advance button 150. Such a rail switch could comprise a sensor along the conveying rail which is energized by the passage of each chain trolley position.

The system may have an alarm which is energized if the injection count at any station is not a desired number such as four at the time the side moves to the next injection station. In the illustrative embodiment, the sides are automatically conveyed from one injection station to another and the operator, by pressing advance button 150, only advances weight data into the next storage locations, but does not affect the movement of the sides. As each new carcass enters the system, the operator presses the advance button 150, and then enters the weight of the new carcass by pushing either increase button 146 or decrease 147. The store weight button 148 is then pressed and the sequence discussed above is again followed, with the weight data being shifted as the sides are conveyed from injection station to the next.

The events with respect to the existng side of beef can be viewed by the operator pressing the "view stations" button 154. The weight of the exiting side to be viewed will be presented at display 142 and the number of injections that this side has received will be displayed at displays 138 and 141. Thus if display 142 reads "670" and displays 135, 138 and 141 read "516", this means that the carcass side exiting the system has been processed according to the prescribed percentage of weight corresponding to the carcass weight of 670 pounds and that sixteen injections have been performed on the side. Likewise, the "scan stations" button 146 may be pressed to monitor the occurrences at other stations. When the "scan stations" button 156 is first pressed, the status at station 1 is displayed. The weight data in the station 1 storage location will be displayed at display 142 and the number "1" will be displayed at display 135 with the total number of injections received by the side now in station 1 displayed at displays 138 and 141. When the "scan stations" button is pressed again, the weight data in the station 2 storage location will be displayed at display 142 and the number "2" displayed at display 135 with the number of shots reinserts his respective headers into a specific portion of the carcass of beef or other animal, and then depresses toggle switch 54 to activate the system, if operated manually. Alternatively, automatic triggering to activate the system can be accomplished by a baroperated switch which is activated as the needles enter the carcass.

Accordingly, as the beef carcass passes along the process line 10 in the direction of arrow 12, it is presented first to the station of operator 14 where headers H1 through H4 are inserted in specified locations of the beef, and then withdrawn after the injection process is complete.

Followig this, the beef carcass passes to the station of operator 15, where headers H5 through H8 are individually inserted and triggered at different specified locations of the carcass, and then withdrawn after the injection process is complete.

Following this, the carcass passes along in similar manner to the stations of operators 16 and 17, so that the carcass is completely processed in this sequential method of treatment, and then passes off the kill floor for storage or chilling.

The system of this invention is capable of very high volume operation since operators 14 through 17 can be simultaneously working at their respective stations on different beef carcasses without the necessity, as in the prior art, of having to insert all of the needles into the carcass prior to activating the injection sequence.

Figure 5:
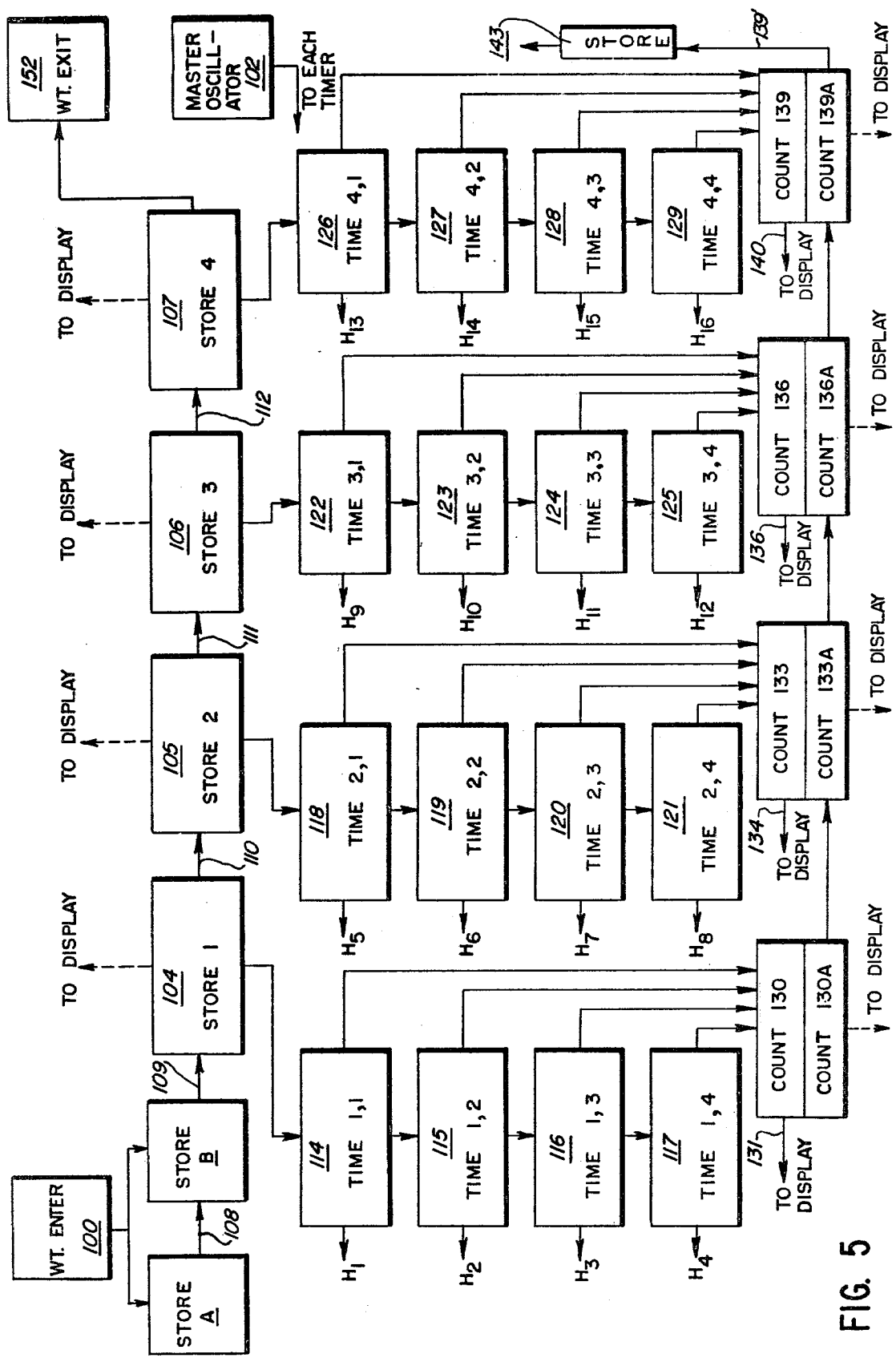
FIG. 5 is a block diagram of a control system in accordance with the present invention.

The injection timing system is illustrated in FIG. 5. Referring to FIG. 5, as the carcass enters the system, the weight of the carcass is determined either automatically or manually at scale 100. Digital signals, by means of an A/D converter or other means as are well-known in the art, are transmitted to storage locations A and B of a RAM. The digital signals stored in storage locations A and B represent the weight of the carcass determined at scale 100, with the stored weight at storage location B representing the first side of the carcass and the weight stored at storage location A representing the other side of the carcass.

Each of the injection stations has a corresponding storage location and four independent timing means. The storage locations are storage locations of a RAM and the timing means preferably comprise down counters which are counted down by means of a master oscillator 102.

Thus a storage location 104 is provided for storing weight data for the first injection station, storage location 105 is provided for storing weight data for the second injection station, storage location 106 is provided for storing weight data for the third injection station and storage location 107 is provided for storing weight data for the fourth injection station. Storage locations A, B, 104, 105, 106 and 107 are linked together by means of transmission lines 108, 109, 110, 111 and 112, respectively.

The timing mechanism for each header includes a down counter. Thus timers 114, 115, 116 and 117 are provided for energizing headers H1, H2, H3 and H4, respectively, of the first injection station. Likewise, timers 118, 119, 120 and 121 are provided for energizing headers H5, H6, H7 and H8, respectively, of the second injection station. Timers 122, 123, 124, 125 are provided for energizing headers H9, H10, H11 and H12, respectively, of the third injection station and timers 126, 127, 128 and 129 are provided for energizing headers H13, H14, H15 and H16, respectively, of the fourth injection station. An output of each of the timers 114-117 is fed to shot counters 130 and 130A. Line 131 transmits the contents of counter 130 to a digital display 132 (FIG. 4). The count that is transmitted via line 131 corresponds to the number of injections of the first injection station that have been accomplished. As the carcass side is shifted to the next station, the counters 130, 133, 136 and 139 are reset to zero.

Likewise, an output of each of timers 118-121 is fed to counters 133 and 133A. Line 134 transmits the contents of counter 133 to a digital display 135 (FIG. 4). An output of each of the timers 122-125 for the third injection station is fed to counters 133 and 133A. Line 137 transmits the contents of counter 136 to a digital display 138. Likewise, an output of each of timers 126-129 of the fourth injection station is fed to counters 139 and 139A which feeds count information via line 140 to a digital display 141 (FIG. 4). Output lines are also provided from the storage locations A, B, 104, 105, 106, 107, and 152 to digital display 142 so that the operator can view the weight that is stored at a selected location corresponding to a selected injection station.

Counters 130A, 133A, 136A and 139A are connected to each other via lines 130', 133', 136', respectively, and counter 139A is connected to an output station storage location 143 via line 139'. These connections from an upstream counter to a downstream counter provide for the shot count in each counter to be added to the downstream counter when shifting of the weight data occurs. The content of counters 130A, 133A, 136A, 139A and storage location 1 and 3 can also be transmitted to displays 130 and 141 under operator control.

Thus containers 130, 133, 136 and 139 form station counters which count the actual number of injections that are occuring while the carcass side is at the particular station. When the carcass side shifts from one station to the next, counters 130, 133, 136 and 139 are reset to zero. Counters 130A, 133A, 136A and 139A form tracking counters which provide a tracking subtotal of the number of injections in the carcass side as it moves from station to station. Each tracking counter will store the total number of injections that has been received by the carcass side that is in the tracking counter's respective station. Thus, if a carcass side is in the third station and it has received four injections in the first station, four injections in the second station and three injections in the third station, counter 136 will have three counts and counter 136A will have eleven counts.

The timing is accomplished as follows. For illustrative purposes only (and this rate may be varied greatly), it will be assumed that a 600 pound carcass enters the system and that the delivery rate of enzyme solution is such that a proper injection is achieved at the rate of 200 pounds per second. Thus a 600 pound carcass should receive a 3 second delivery from each injection header. To this end, the master oscillator 102 is calibrated so as to have a frequency of 200 hertz. The master oscillator is coupled to down timers 114-129 so that once the down timing is initiated, the master oscillator will oscillate so as to count down to zero. For example, if down counter 114 has stored a digital count of 600, as soon as the trigger of injection header H1 is pulled, the down counter will begin to count down at a rate determined by the master oscillator. Since master oscillator 102 has a frequency of 200 hertz, it will take 3 seconds for counter 114 to count down from 600 to 0. During these three seconds, the injection solution will be dispensed ceived by the side in station 2 displayed at display 138 and 141.

In the illustrative embodiment, the storage locations and counters are of the digital type which are suitable for use in a microprocessor system, with the storage data being digital and with all signals being transmitted as digital signals. Although this illustrative embodiment has been shown and described, it is to be understood that various modifications and substitutions may be made by those skilled in the art without departing from the novel spirit and scope of the present invention.

It is also to be understood that the present invention is applicable to the tenderizing of all types of edible meats and poultry.

We claim:

1. A system for injecting slaughtered carcasses with tenderizing solution, in which the carcasses to be injected are weighed and are conveyed to a plurality of sequential injection stations, the improvement comprising, in combination:

at least one injection header located at each injection station;
    means for providing injection solution to each header;
    storage means for storing weight data for each injection station;
    means for providing weight data to said storage means, in sequence corresponding to the injection station sequence, whereby different carcasses may be at each of the plurality of stations at the same time and each carcass will be tracked as it is conveyed to each successive station and the weight data in a storage location for the respective station will correspond to the carcass at the respective station;
    means for providing energization time periods that are directly proportional to the carcass weight; and
    means for energizing the injection headers for calculated energization time periods whereby each carcass is injected by each injection header with solution that flows automatically for said calculated time period that is directly proportional to the carcass weight.

2. A system for injecting carcasses as described in claim 1, including a plurality of injection headers located at each injection station, and means for counting the number of injections which occur at each injection station.

3. A system for injecting carcasses as described in claim 2, including means for displaying the number of injections which have occurred at each injection station.

4. A system for injecting carcasses as described in claim 1, including a separated timing means for each injection station, and means for providing data from said storage locations to said timing means in sequence as the carcass to be injected is conveyed to sequential injection stations.

5. A system for injecting carcasses as described in claim 4, wherein each of said timing means comprises a down counter; and an oscillator for counting down said down counters to provide calculated energization time periods.

* * * * *